(12) United States Patent
Lahoda et al.

(10) Patent No.: US 6,241,800 B1
(45) Date of Patent: Jun. 5, 2001

(54) ACID FLUXES FOR METAL RECLAMATION FROM CONTAMINATED SOLIDS

(75) Inventors: Edward J. Lahoda, Pittsburgh, PA (US); Khoa T. Ha, Decatur, GA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/389,673

(22) Filed: Sep. 2, 1999

(51) Int. Cl.$^7$ .............................. C22B 3/04; C22B 60/02
(52) U.S. Cl. ............................ 75/398; 75/399; 75/711
(58) Field of Search ........................ 75/398, 399, 711; 423/3

(56) References Cited

U.S. PATENT DOCUMENTS

| | | | |
|---|---|---|---|
| 2,925,321 | * 2/1960 | Mariacher | 423/20 |
| 3,882,040 | * 5/1975 | Auge et al. | 423/2 |
| 4,430,309 | 2/1984 | York . | |
| 4,446,114 | 5/1984 | Jardine et al. . | |
| 5,045,240 | 9/1991 | Skriba et al. . | |

OTHER PUBLICATIONS

Seeley et al., "Development of Processes for the Solubilization of Uranium from Waste Leach Residue" (ORNL/TM–8913), Mar. 1984, pp. 1 & 21–25, Oak Ridge National Laboratory, Oak Ridge, TN.

Wilson (ed.), *The Nuclear Fuel Cycle: From Ore to Wastes*, 1996, pp. 33–46, Oxford University Press, New York, NY No Month.

Chang & Shih, "A General Method for the Conversion of Fly Ash into Zeolites as Ion Exchangers for Cesium," *Industrial & Engineering Chemistry Research*, 1998, pp. 71–78, vol. 37(1), American Chemical Society, Washington, DC No Month.

Comor et al., "Modeling of the Simultaneous Extraction of Nitric Acid and Uranyl Nitrate with Tri–n–butyl Phosphate. Application to Extraction Operation," *Separation Science and Technology*, 1999, pp. 115–122, vol. 34(1), Marcel Dekker, Inc., Monticello, NY No Month.

* cited by examiner

Primary Examiner—Roy King
Assistant Examiner—Tima McGuthry-Banks

(57) ABSTRACT

A method of recovering contaminating or valuable components from a solid feed material (10), includes feeding the material (10) into an optional grinder as a pretreatment (12), then into a heated melter (14) along with a material (16) that provides fluorine, to provide a molten or semi-molten material, where the molten material is then reacted with water or an acid solution (22) in vessel (20), to form a dissolved molten or semi-molten salt in solution, which can be passed to extractor (26) or the like and provide a concentrated stream of the valuable or contaminating components (30).

14 Claims, 1 Drawing Sheet

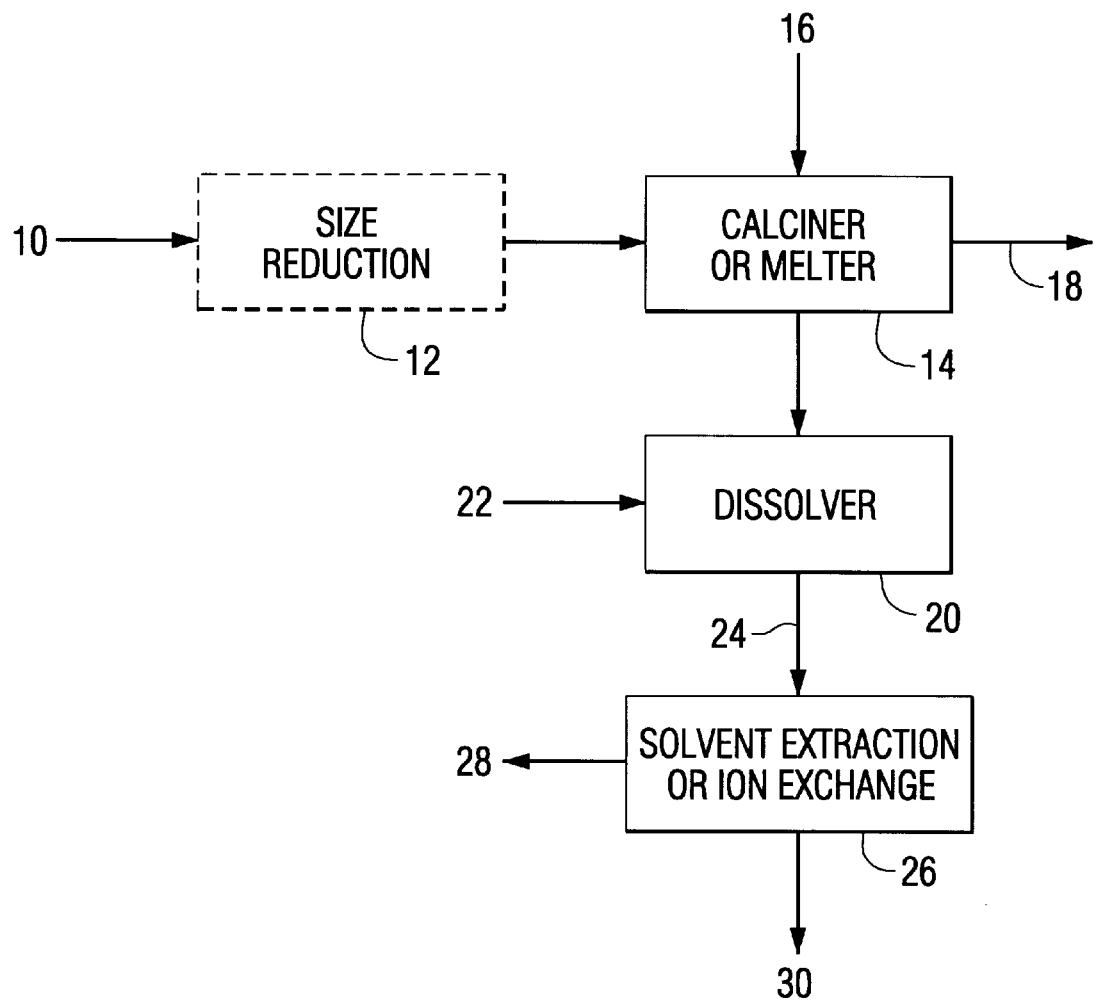

ACID FLUXES FOR METAL RECLAMATION FROM CONTAMINATED SOLIDS

BACKGROUND OF THE INVENTION

1. Field of the Invention

This invention relates to an acid flux melt process that allows melting of incinerator ash and other solid materials that are normally difficult to dissolve, to be readily dissolved in acid. The melt process is performed at a very low temperature, after which the melt can be dissolved and solutions passed to a solvent extraction process or other process to recover the valuable or contaminating materials from the solution.

2. Background Information

The use of an incinerator to treat combustible wastes from a nuclear facility, such as HEPA filters, results in a dramatic decrease in low level and high level waste volume. The remaining material, the ash, contains most of the metals which would include radioactive materials. These radioactive materials make this waste a low level, and sometimes a high level, radioactive waste that must be disposed of, usually at great cost. One method for reducing this cost at facilities where the radioactive material has value, that is a nuclear fuel manufacturing facility, is to remove the radioactive material for recycle to the process. If this removal is complete, or nearly complete, then the remaining ash can be disposed of as non-radioactive waste at a much reduced cost. In addition, the value of the recovered materials in the waste, which may be of substantial value, is not lost.

Many methods have been tried for recovering materials from incinerator ash. However, this ash is usually in a crystalline/glassy oxide form which is very difficult to dissolve. Some have attempted leaching with strong acids. These attempts have not resulted in complete recovery. For example, repeated leaching of uranium containing incinerator ash has reduced initial uranium levels from the 10% to 40% level to the 6,000 ppm (parts per million) U range. Pre-grinding has not improved this residual uranium level. Since residual levels of less than about 7 ppm U are required for the leached ash to be classified as clean, this ash must be buried as low level radioactive waste at great expense. In addition, the residual uranium values are lost and the large quantities of contaminated leach solution must still be processed at some cost. One such method, taught by F. G. Seeley, et al. in *Oak Ridge National Laboratory Report* ORNL/TM-8913 "Development of Processes For The Solubilization of Uranium From Waste Leach Residue." Abstract and pp. 21–25, March 1984, utilizes a cal-sinter process, where CaO is used as a sintering media. In the process, the CaO reacts with refractory metal silicates at 1200° C., and provides subsequent solubilization of uranium from the sinter matrix by an acid leach. Another process employs fluoride in the sinter media to free the uranium from refractory silicate at a lower temperature of 700° C. to 900° C., so that the uranium is soluble in subsequent acid leaching.

The acid resulting from these leaching processes is then treated to recover the valuable components. Leach acid processing to recover the valuable components of a feed solution can involve extraction, scrubbing, stripping and precipitation steps, as taught in *The Nuclear Fuel Cycle,* ed. P. D. Wilson, Oxford University Press, pp. 33–46, (1996), and *Separation Science and Technology,* "Modeling Of The Simultaneous Extraction of Nitric Acid And Uranyl Nitrate With Tri-n-butyl Phosphates• Application To Extraction Operation." Jozef J. Connor et al. 34(1), pp. 115–122, (1999). Other well known processes to recover uranium and other metal values from a variety of starting materials include U.S. Pat. No. 5,045,240 (Skriba et al.) were leaching in a fluidized bed and U.S. Pat. Nos. 4,446,114 and 4,430,309 (Jardine et al. and York, respectively) relating to sulfuric acid or nitric acid addition to a scrub, strip or wash step during the subsequent solvent extraction step.

Other methods have also been tried. The most successful has been dissolution in molten caustic (NaOH). While resulting in complete dissolution of the incinerator ash into a melt, this melt has a relatively high melting point, 594° C. (1100° F.) or greater, depending on the amount of silicon and aluminum present and the amount of carbon dioxide absorbed. Another difficulty results from the aluminum metal that may be present. Aluminum is a common component of incinerator ash from nuclear facilities and results from the HEPA filters that are commonly incinerated to reduce their volume. The aluminum metal remains in the ash and reacts with the caustic to produce hydrogen gas, which can explode. This characteristic certainly is not desirable in a nuclear facility and is considered a severe safety hazard. One such caustic dissolution method is taught by H. L. Chang et al. in *Ind. Eng. Chem. Res.,* "A General Method For The Conversion Of Fly Ash Into Zeolites As Ion Exchangers For Cesium" 37, pp. 71–78, (1998), where fly ash from utility power plants was fused with NaOH, at the temperature of 550° C., followed by dissolution in water and a hydrothermal treatment.

What is needed is a low temperature process that results in superior uranium recovery in a cost effective manner and does not produce hydrogen or other undesirable off-gases.

SUMMARY OF THE INVENTION

Thus, it is a main object of this invention to provide a high yield, low cost, low temperature process to treat solid material which contains valuable or contaminating components, by a flux melt step, preferably below 425° C. (797° F.), prior to dissolution and passage of the solution to a solvent extraction or ion exchange processes for final recovery of the component(s).

It is another main object of this invention to provide a flux material capable of reacting with highly crystalline or glass ash or other solids which contains uranium, to provide a high yield of uranium removal so fly ash can, with further processing, be disposed of as a non-radioactive waste. There may be other valuable components in the ash. These may also be recovered upon solubilization of the solid ash.

These and other objects are accomplished by providing a method of treating highly crystalline or glassy, oxidized incinerator ash which contains uranium values over 7 parts per million parts ash by the steps of (A) fluorination of the ash with a fluorine containing compound at a temperature of between 260° C. and 500° C. to form a material which contains uranium; (B) solubilizing the material formed in step (A) with a hydrogen containing liquid selected from the group consisting of water and acid solution; and (C) treating the solubilized material to remove the uranium.

The objects are also accomplished by providing a method of treating a solid material containing valuable or contaminating solids by the steps of (A) admixing at least one material that can provide a source of ammonium and fluoride in combination with a solid material containing valuable or contaminating solids, to provide an admixture; (B) heating the admixture of step (A) at a temperature of between 260° C. and 500° C. for a time effective to provide at least one of $NH_4F$ or $NH_4F \cdot HF$ in combined or ionic form and form a molten or semi-molten material allowing formation of a soluble material containing the valuable or contaminating solids; (C) treating the molten or semi-molten material with a hydrogen containing liquid selected from the group consisting of water and acid solution to provide a dissolved salt in solution; and (D) treating the salt in solution to remove the valuable or contaminating solids. The method is specifically directed to uranium, usually from a nuclear facility, which is present in the material to be treated, which material is usually incinerated ash. The starting ash is usually in a crystalline or glassy oxidized form, depending on the composition and temperature. In step (A) the material (s) is preferably selected from at least one of $NH_4F$ or $NH_4F.HF$. In step (C) up to 68 wt % nitric acid ($HNO_3$) is used. The temperatures in step (B) are preferably between 260° C. and 425° C.

This process overcomes all the disadvantages of prior art fluxing processes described previously. This process mixes $NH_4F$ (ammonium fluoride) or $NH_4F.HF$ (ammonium fluoride•hydrofluoric acid), or other sources of materials that can form $NH_4F$ with incinerator ash, either pulverized or not, and heats the mix to preferably to between 260° C. (500° F.) and 425° C. (797° F.). This can be performed in any number of processes including but not limited to a heated rotary kiln, batch pot or semi-batch furnace. The resulting melt or solids is then held for up to 4 hours. The batch can be mixed into water or an acid solution, onto a flaking drum, or into molds for later dissolution. The preferred approach is to mix the melt or solid into a 10 wt % nitric acid solution which is then finally treated to remove the uranium or other valuable or contaminating solids. This final step may be carried out in a number of different ways depending on the type of materials remaining in the solution, preferably by solvent extraction which is well known in the art. This total process is extremely successful in breaking down the highly crystalline or glassy oxidized starting materials by fluorinating them as first step.

BRIEF DESCRIPTION OF THE DRAWING

There are shown in the drawings certain exemplary embodiments of the invention as presently preferred. It should be understood that the invention is not limited to the embodiments disclosed as examples, and is capable of variation within the spirit and scope of the appended claims. In the drawings, FIG. 1 is a block diagram of the method of this invention.

DESCRIPTION OF THE PREFERRED EMBODIMENTS

Referring now to FIG. 1, a feed of solid, unleached feed material (10) containing a valuable or contaminating material, for example, "radioactive material" is shown. The term "radioactive material" is also meant to include metals, fibrous or metal screen filters, and the like, which have become radioactive due to use in nuclear facilities, or due to storage of or with radioactive material, or the like. The contaminated material might also be bio-contaminated ash which contains valuable (for example, silver, platinum, etc.) or contaminating solids (for example, Cd, Pb, etc.) Specifically, the solid material (10) is sized reduced/ground in a grinder, or the like, as an optional pre-treatment step (12), to a preferred optimum chunk size or particle size, to provide optimal reaction, yield, and reaction time of the contaminated material at the end of the process. Preferably, for quick reaction times and best yield, the feed should be in pieces no larger than about 0.1 cubic centimeter. The feed ash (10), pretreated or not, is then mixed with $NH_4F$ or $NH_4F.HF$ (16) and mixtures thereof in the weight ratio of between 1 to 1 and 1 to 5 to form the feed material to the melter.

A melter means (14) is shown, which can be a rotary kiln, batch pot or semi continuous furnace where feed material (10), pulverized or not, is reacted. The feed material (10) is reacted with materials (16) that provide a source of fluoride at between about 250° C. to about 500° C. Off-gas passes through line 18. The melt is held for a period of time, preferably from 10 minutes to 10 hours, most preferably from 10 minutes to 2 hours. In the preferred embodiment, ash, which contains uranium values, is fed into the melter, with $NH_4F$ flux at a temperature of about 371° C. whereupon off gas is vented through line 18.

The melt is then reacted with water or an acid solution, 22, such as any organic or inorganic acid, preferably a 5% by wt to 66% by wt nitric acid solution. Reaction is preferably by passing the melt from the melter means 14 to a separate reactor means 20 which already contains nitric acid, to provide a dissolved molten salt in solution within vessel 20. Preferably, the molar ratio of contaminated metal (such as uranium) in the ash or other source:fluorine (which here includes fluoride) is between 0.05 to 2 moles:1 mole fluorine. Preferably the molar ratio of contaminated metal in the melt (molten state) to acid in solution used to form a dissolved molten salt in solution is between 0.1 to 15 moles metal:1 mole acid in solution.

Thus, the process involves an initial flux step with fluorine (which here includes fluoride) followed by a leach step with, preferably, nitric acid solution. This provides a minimal increase in mass during the steps. The dissolved molten salt in solution (for example, a uranyl nitrate or a mixture of fluoride and nitrates is passed via line 24 to a uranium (or whatever the contaminated metal happens to be) recovery means 26 while clean aqueous waste, 28, such as ash cleaned below 7 ppm U is passed via stream 28 to driers, (or recycled to the beginning of the acid flux process or the incinerator), and then to non-radioactive waste disposal, while, for example, concentrated uranium nitrate 30 is provided. The dissolved molten salt in solution is then treated by either ion exchange or solvent extraction or other separation methods that can be used to remove the uranium or other radioactive or valuable materials. The decontaminated solution is then disposed of directly or the solids removed and disposed of separately as non-radioactive waste, as is well known in the art and as taught, generally, for example by the Skriba et al., Jardine et al., or York patents previously mentioned.

The invention will now be further illustrated by way of the following example.

EXAMPLE

A 10.02 gram sample of pulverized incinerator ash containing 145,820 ppm of U was mixed into 18.05 grams of ammonium bifluoride ($NH_4F$—HF) in a 600 ml beaker. The beaker was then placed in an oven at 371° C. (700° F.) for 75 minutes. After 75 minutes, the beaker was removed from the oven, and the contents of the beaker weighed. The measured weight was 18.82 grams. The solids were then dissolved into 600 milliliters of 10% by weight $HNO_3$ at 70° C. After leaching for 5 hours, the slurry was filtered. The filtrate weighed 540.75 grams. A filtrate sample was analyzed for uranium and found to have 2,716 ppm U. The residual solids were dried and found to weigh 1.19 grams. A mass balance on the uranium gives the following:
Uranium In: $10.02*145,820/1\times10^6=1.4611$ g U
Uranium Out: $540.75*2,716/1\times10^6=1.469$ g U % Recovered: 100.5%
Solids In: 10.02
Solids out: 1.19
% Solids Dissolved: 88.%

This example shows how about 100% of the uranium was recovered from the original ash while reducing the amount of potentially uranium contaminated solids by 88%. This compares with the traditional leaching process where the solid volume is reduced by only 50% and only about 98% of the uranium was recovered. In reality, the small amount of residual solids would be recycled through the process to totally eliminate any potentially contaminated solids.

While specific embodiments of the invention have been described in detail, it will be appreciated by those skilled in the art that various modifications and alternatives could be developed in light of the overall teaching of the disclosure. Accordingly, the particular arrangement disclosed are meant to be illustrative only and not limiting as to the scope of the invention, which is to be given the full breadth of the claims appended and any and all equivalents thereof.

What is claimed is:

1. A method of treating highly crystalline or glassy, oxidized incinerator ash which contains uranium values over 7 parts per million by the steps of:
   (A) fluorination of the ash with a fluorine containing compound at a temperature of between 260° C. and 500° C. to form a material which contains uranium;
   (B) solubilizing the material formed in step (A) with a hydrogen containing liquid selected from the group consisting of water and acid solution; and
   (C) treating the solubilized material to remove the uranium.

2. The method of claim 1, where fluorination in step (A) is by reaction with a source of ammonium and fluoride in combination and the molten material is held at a temperature of between 260° C. and 500° C. for at least about 5 minutes before step (B).

3. The method of claim 1, where the ash is ground to reduce particle size as a first step and where fluorination in step (A) is by reaction with a material selected from the group consisting of $NH_4F$ and $NH_4F.HF$ and mixtures thereof.

4. The method of claim 2, where the molar ratio of uranium in the incinerator ash:fluorine is between 0.05 to 2 moles uranium:1 mole fluorine.

5. The method of claim 2, where the molar ratio of uranium in the molten material:acid in solution is between 0.1 to 15 moles uranium:1 mole acid in solution.

6. A method of treating a solid material containing valuable or contaminating solids by the steps of:
   (A) admixing at least one material that can provide a source of ammonium and fluoride in combination with a solid material containing valuable or contaminating solids, to provide an admixture;
   (B) heating the admixture of step (A) at a temperature of between 260° C. and 500° C. for a time effective to provide at least one of $NH_4F$ or $NH_4F.HF$ in combined or ionic form and to form a molten or semi-molten material;
   (C) treating the molten or semi-molten material with a hydrogen containing liquid selected from the group consisting of water and acid solution to provide a dissolved salt in solution; and
   (D) treating the salt in solution to remove the valuable or contaminating solids.

7. The method of claim 6, where the metal in the solid material is uranium, the solid material is incinerator ash, the molten or semi-molten material is held at a temperature of between 260° C. and 500° C., and the hydrogen containing liquid is an acid solution.

8. The method of claim 6, where the contaminated solids are in a highly crystalline or glassy oxidized form.

9. The method of claim 6, where the solid material is ground to reduce particle size as a first step, and where the material providing a source of ammonium and fluorine in step (A) is a material selected from the group consisting of $NH_4F$ and $NH_4F.HF$ and mixtures thereof which material is also present in step (B).

10. The method of claim 6, where a nitric acid solution is the hydrogen containing liquid in step (D).

11. The method of claim 6, where treatment in step (D) is by an ion exchange process.

12. The method of claim 6, where treatment in step (D) is by a solvent extraction process.

13. The method of claim 7, where the molar ratio of uranium in the incinerator ash:fluorine is between 0.05 to 2 moles uranium:1 mole fluorine.

14. The method of claim 7, where the ratio of uranium in the molten material:acid in solution is between 0.1 to 15 moles uranium:1 mole acid in solution.

* * * * *